United States Patent
Parkinson

(10) Patent No.: US 11,068,426 B2
(45) Date of Patent: Jul. 20, 2021

(54) PORTABLE STORAGE DEVICE CAPABLE OF TRANSFERRING DATA TO A PORTABLE STORAGE DEVICE

(75) Inventor: Steven William Parkinson, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 622 days.

(21) Appl. No.: 11/469,483

(22) Filed: Aug. 31, 2006

(65) Prior Publication Data

US 2008/0059700 A1    Mar. 6, 2008

(51) Int. Cl.
*G06F 12/00* (2006.01)
*G06F 13/38* (2006.01)
*G06F 21/60* (2013.01)

(52) U.S. Cl.
CPC .......... *G06F 13/385* (2013.01); *G06F 21/606* (2013.01)

(58) Field of Classification Search
CPC ............................... G06F 13/385; G06F 21/606
USPC ................... 711/115, 103; 710/62, 305, 313; 713/183, 184; 726/29, 27
See application file for complete search history.

(56) References Cited

U.S. PATENT DOCUMENTS

| | | | |
|---|---|---|---|
| 5,142,277 A * | 8/1992 | Yarberry et al. | 340/825.57 |
| 6,650,089 B1 * | 11/2003 | Freeman et al. | 320/132 |
| 7,511,233 B2 * | 3/2009 | Pocrass | 174/541 |
| 7,620,740 B2 * | 11/2009 | Takase et al. | 710/2 |
| 8,245,305 B2 * | 8/2012 | Mochizuki | 726/26 |
| 2003/0195639 A1 * | 10/2003 | Nixon | G05B 19/0426 700/19 |
| 2004/0019742 A1 * | 1/2004 | Wei et al. | 711/115 |
| 2004/0148482 A1 * | 7/2004 | Grundy | G06F 12/06 711/167 |
| 2004/0193764 A1 * | 9/2004 | Watanabe | 710/62 |
| 2005/0015525 A1 * | 1/2005 | Cahill et al. | 710/62 |
| 2005/0066129 A1 * | 3/2005 | Chang et al. | 711/115 |
| 2005/0078696 A1 * | 4/2005 | Oner | 370/419 |
| 2005/0086413 A1 * | 4/2005 | Lee et al. | 710/313 |
| 2005/0109841 A1 * | 5/2005 | Ryan et al. | 235/380 |
| 2005/0201049 A1 * | 9/2005 | Osaka | 361/683 |
| 2005/0226271 A1 * | 10/2005 | Ko et al. | 370/470 |
| 2006/0025207 A1 * | 2/2006 | Walker et al. | 463/25 |
| 2006/0074600 A1 * | 4/2006 | Sastry | G06F 21/57 702/187 |
| 2006/0095644 A1 * | 5/2006 | Fujita | G06F 13/4027 710/313 |
| 2006/0149895 A1 * | 7/2006 | Pocrass | 711/103 |
| 2006/0152588 A1 * | 7/2006 | Iida et al. | 348/207.99 |
| 2006/0218408 A1 * | 9/2006 | Serpa | 713/183 |
| 2006/0265596 A1 * | 11/2006 | Nagayama | 713/182 |

(Continued)

OTHER PUBLICATIONS

Peter Norton, The Norton Desktop, Symantec, Version 3, pp. 5-2, 5-3, 5-4, 1991-1993.*

*Primary Examiner* — Gurtej Bansal
(74) *Attorney, Agent, or Firm* — Lowenstein Sandler LLP

(57) ABSTRACT

Embodiments of the present invention relate to a device includes both a transferring and receiving interface. The device may include a direction indicator, for example an arrow, indicating a direction of data transfer. The device may also include a switch, such as a button, to initiate data transfer. The device may also include a counter, display, or light that indicates the amount data transferred and serves as a user interface. The device may also include a power source, such as a battery, to power the device during data transfer.

22 Claims, 3 Drawing Sheets

(56) References Cited

U.S. PATENT DOCUMENTS

| | | | |
|---|---|---|---|
| 2006/0277334 A1* | 12/2006 | Sim et al. | 710/62 |
| 2006/0277608 A1* | 12/2006 | Imaida | H04N 5/765 |
| | | | 726/27 |
| 2007/0100771 A1* | 5/2007 | Eckleder et al. | 705/67 |
| 2007/0150826 A1* | 6/2007 | Anzures et al. | 715/772 |
| 2007/0248311 A1* | 10/2007 | Wice et al. | 386/52 |
| 2007/0271494 A1* | 11/2007 | Gorobets | G06F 11/1068 |
| | | | 714/763 |
| 2008/0052439 A1* | 2/2008 | Young et al. | 710/305 |
| 2008/0052461 A1* | 2/2008 | Kavian | 711/115 |
| 2009/0011793 A1* | 1/2009 | Pocrass | 455/556.1 |

* cited by examiner

PORTABLE STORAGE DEVICE CAPABLE OF TRANSFERRING DATA TO A PORTABLE STORAGE DEVICE

FIELD

This invention relates generally to devices that transfer information.

BACKGROUND

Portable storage devices such as Universal Serial Bus (USB) flash drives have become popular for externally storing data and for externally transferring data between computers. Conventional USB flash drives include a single USB connector. Typically, USB flash drives include a male type-A USB connector. In order to transfer data to and from the USB flash drive, the drive must be connected to a separate computer.

Presently, there exists no easy method to transfer data between two devices. In order to transfer data between devices, these devices drive must be connected to a separate computer and the data transferred to the computer. Then, the receiving device must be connected to the computer and the data transferred to that device. However, this process adds additional time and steps to the data transfer. Further, if no computer is available, data may not be transferred between these devices.

BRIEF DESCRIPTION OF THE DRAWINGS

The accompanying drawings, which are incorporated in and constitute a part of this specification, illustrate one embodiment of the invention and together with the description, serve to explain the principles of the invention.

DESCRIPTION OF THE EMBODIMENTS

According to embodiments of the present invention, a device includes both a transferring and receiving interface. For example, the device may be implemented as a USB flash storage device that includes both a male and female USB interface. The device may include a direction indicator, for example an arrow, indicating a direction of data transfer. The device may also include a switch, such as a button, to initiate data transfer. The device may also include a counter or light that indicates the amount data transferred. The device may also include a power source, such as a battery, to power the portable storage device during data transfer.

By including both a transferring and receiving interface, data may be transferred directly between devices. According, data may be transferred between devices without the requirement of transferring the data to an intermediate device. According to embodiments, the device may directly transfer various types of data, such as files, digital cash, or security information to other portable storage devices. For example, the devices may be configured to transfer a security authorization object among devices. A security authorization object is any object, which when presented to a relying party, will allow the holder of that object to perform some action. For example, a security authorization object may indicate that the holder of the device has been authorized to perform certain tasks or approve various transactions, such as a manager or administrator. Embodiments of the present invention allow for the secure transfer of security authorization objects.

Reference will now be made in detail to the exemplary embodiments of the invention, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Figure 1:
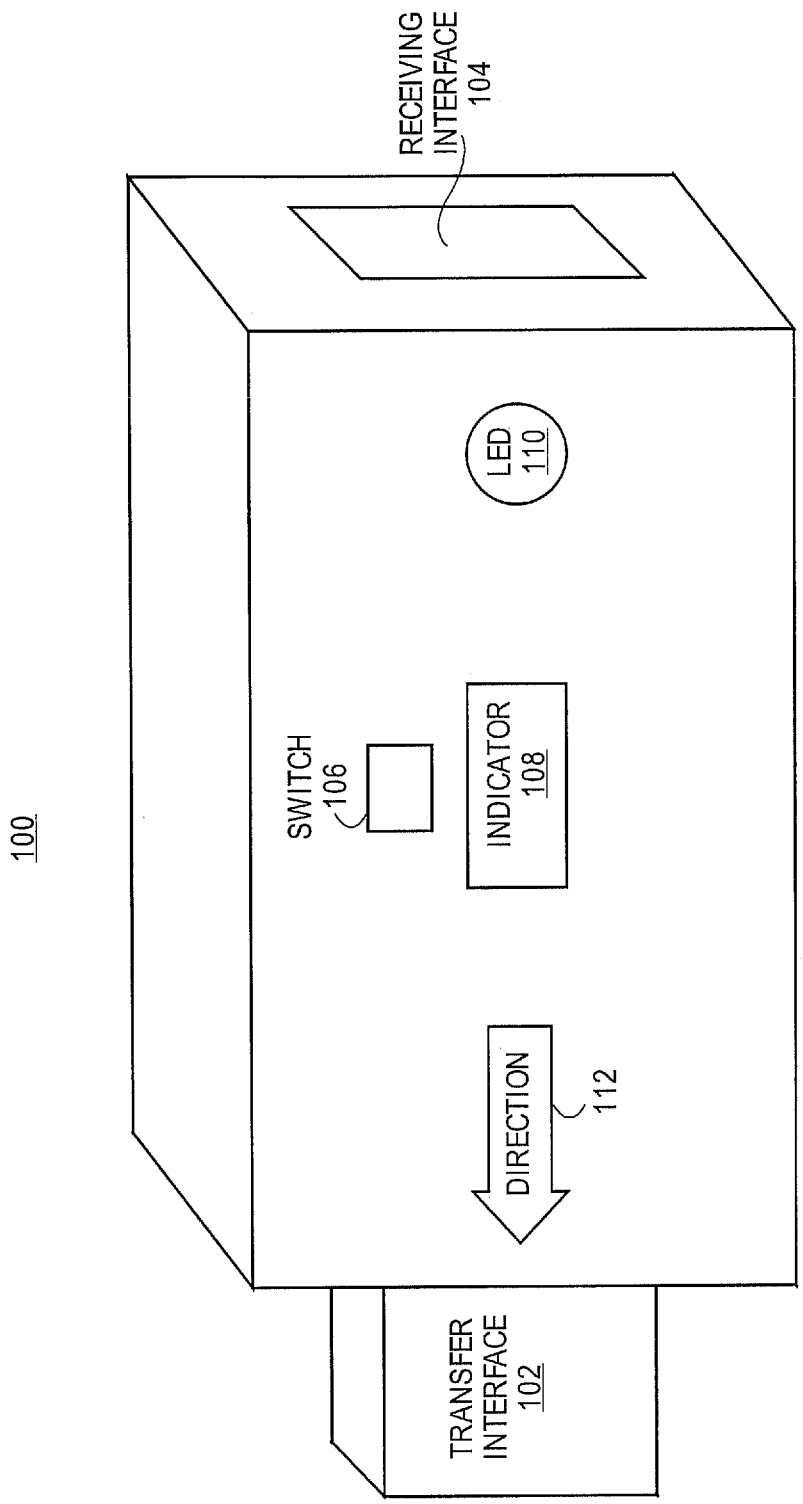
FIG. 1 is a diagram illustrating a portable storage device consistent with embodiments of the present teaching.

FIG. 1 is a diagram illustrating a device 100 according to embodiments of the present teaching. Device 100 includes both a transferring and receiving interface. For example, portable storage device 100 may be a USB flash storage device, a token or smartcard, a mobile phone, or other device that is capable of storing data. In such a case, device 100 may include both a male and female interfaces, such as USB-type interfaces. Of course, other types of interfaces may be implemented on device 100. One skilled in the art will realize that the device may be any type of portable device capable of storing and transferring data. It should be readily apparent to those of ordinary skill in the art that device 100 illustrated in FIG. 1 represents a generalized schematic illustration and that other components may be added or existing components may be removed or modified.

As illustrated in FIG. 1, device 100 includes a transfer interface 102. Transfer interface 102 may be any type of interface capable of mating with the corresponding interface. For example, transfer interface 102 may be a male USB type-A connector. Device 100 may transfer or receive data via transfer interface 102.

Device 100 includes a receiving interface 104. Receiving interface 104 may be any type of interface capable of mating with the corresponding transfer interface. For example, receiving interface 104 may be a female USB type-A connector. Device 100 may transfer or receive data via receiving interface 104. By including both a transferring interface 102 and receiving interface 104, data may be transferred directly from device 100 to another similar device.

Device 100 may include a switch 106. For example, switch 106 may be a button. Switch 106, when actuated, may cause data to be transferred from device 100. Switch 106 may then cause one or more files on device 100 to be copied or moved to a receiving device. Additionally, switch 106, when actuated may cause data to be transferred to device 100. One skilled in the art will realize that switch 106 may be any type of actuation device capable of initiating data transfer to and from device 100.

Device 100 may include a data indicator 108. Indicator 108 may display the amount of data transferred to or received by device 100. For example, indicator 108 may be a display, such as a liquid crystal display, light emitting diode (LED) display, or the like. One skilled in the art will realize that indicator 108 may be any type of device capable of displaying the amount of data received or transferred.

Device 100 may include an activation indicator 110. Indicator 110 may indicate that device 100 has been activated during data transfer or storage. For example, indicator 110 may be a LED. One skilled in the art will realize that indicator 110 may be any type of device capable of indicating that device 100 has been activated.

Device 100 may include a sign 112. Sign 112 may indicate the direction of data transfer. For example, sign 112 may be a directional arrow indicating the direction of data transfer. One skilled in the art will realize that sign 112 may be any type of marking to indicate the direction of data transfer.

Alternatively, device 100 may include a display (not shown). For example, this display may serve as an interface that allows a user to select a file stored on device 100, select a security authorization object, or select an amount digital cash to be transferred. When a user actuates switch 106, a set of menus or other form of user interface may be presented on this display.

Figure 2:
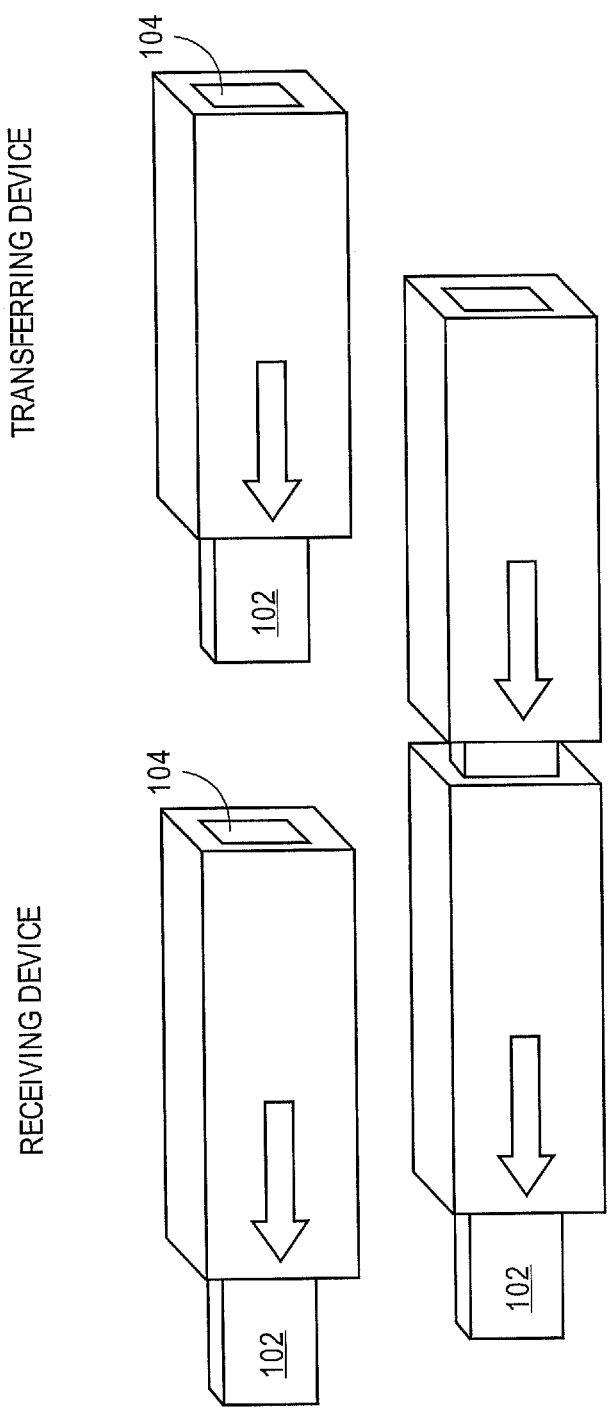
FIG. 2 is a diagram illustrating an operation of a portable storage device consistent with embodiments of the present teaching.

FIG. 2 is a diagram illustrating the operation of two devices 100 consistent with embodiments of the present disclosure. As shown in FIG. 2, data may be transferred by coupling two devices 100. To transfer data, transferring interface 102 of the transferring device may be coupled to receiving interface 104 of the receiving device. Data transfer may be automatically initiated when the transferring device and the receiving device are coupled. Likewise, data transfer may be initiated by switch 106 on either the transferring or receiving device.

As mentioned above, device 100 includes both a transferring and receiving interface. As such, data may be directly transferred between device 100 and similar devices. In some embodiments, device 100 is configured to transfer data according to a protocol that is programmed into the processor of device 100. For example, the orientation of device 100 (as a sender or receiver) may determine whether device 100 is triggered to send or receive data. For example, device 100 may be configured to default to copying data (rather than moving data). If device 100 is involved in a secure transfer, then the protocol may require that an acknowledgement from the receiving device, the sending device may also require that certain information be deleted from the receiving device. For secure transfers, device 100 may be configured to check whether it is coupled to a trusted platform or other device to ensure that no copies are improperly made of its data, to perform a mutual authentication, and to encrypt any data that is transferred.

As a receiving device, device 100 may display or indicate that it is receiving data. In some embodiments, device 100 may be configured to wait for the user to explicitly accept a data transfer before any data is written into its memory. For example, the user may indicate acceptance by pressing switch 106. If the user elects not to accept the data transfer, then device 100 may be configured to power down or remove power from its memory in order to prevent the data transfer. Alternatively, device 100 may also be configured to erase any transferred data from its memory. A user may indicate a refusal of a data transfer at any time, such as, by depressing switch 106.

One skilled in the art will also recognize that embodiments of the present invention enable the chaining of multiple devices and transferring data. For example, three or more devices may be chained together. The last receiving device in the chain may then be configured to merge the data from the previous devices. As another example, the devices in the chain may be configured to iteratively process the data as it passes through them, such as filtering function, successive compression/decompression, encoding/decoding, or successive encryptions/decryptions. Other forms of sequential processing may also be performed in a chain of devices like device 100.

Figure 3:
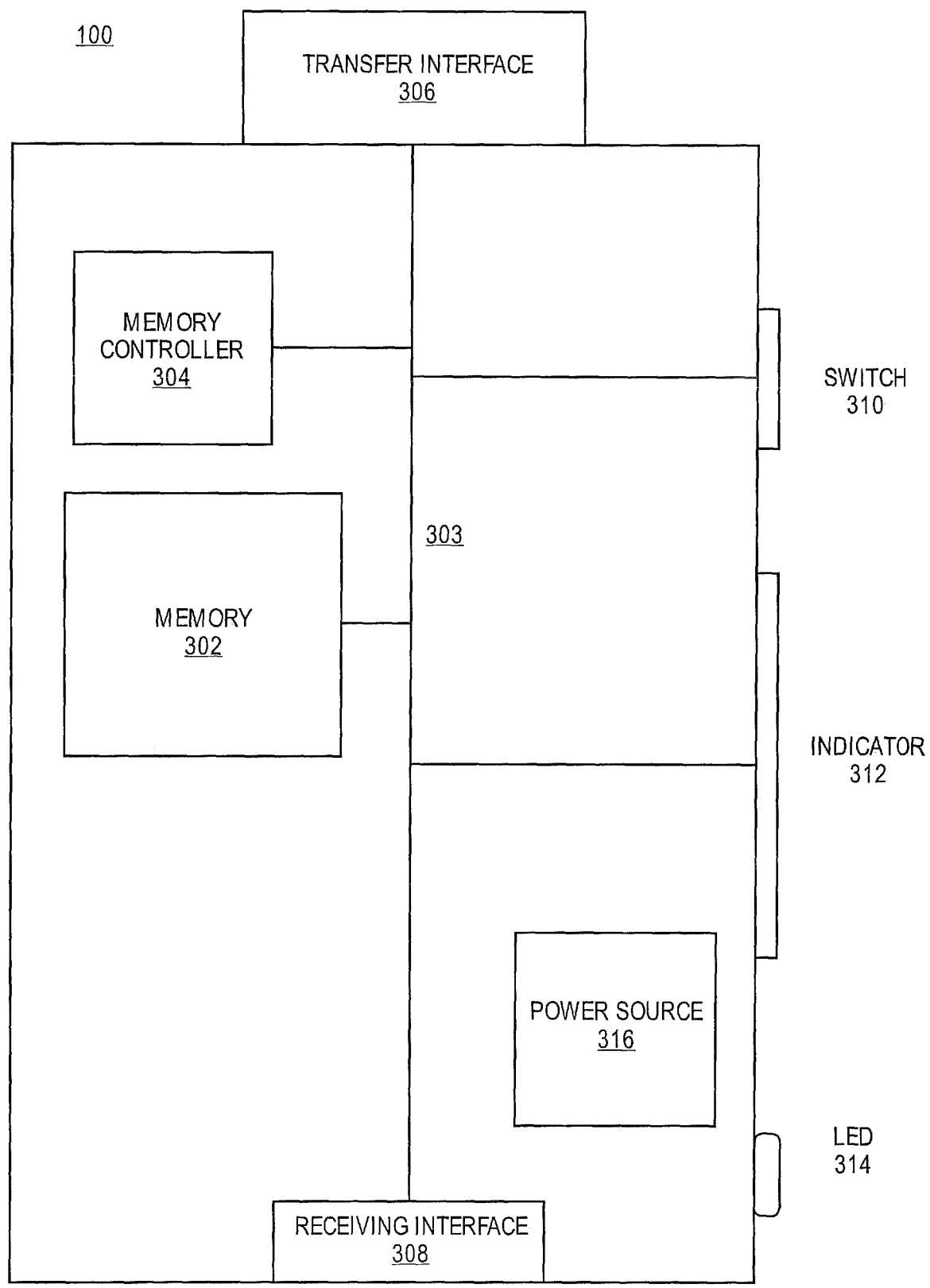
FIG. 3 is a diagram illustrating internal components of a portable storage device consistent with embodiments of the present teaching.

FIG. 3 is a schematic diagram illustrating exemplary components of device 100. It should be readily apparent to those of ordinary skill in the art that display 100 illustrated in FIG. 3 represents a generalized schematic illustration and that other components may be added or existing components may be removed or modified.

As noted, device 100 may be any device that is capable of storing and transferring data. For purposes of explanation, device 100 is implemented as a modified portable storage device, such as a USB drive or the like. Accordingly, device 100 includes a memory 302. Memory 302 may be any type of storage media capable of storing data. For example, memory 302 may be NAND flash memory chip. Memory 302 may be coupled to a communications bus 303.

Device 100 includes a memory controller 304. Memory controller 304 may be any type of electronic device capable of controlling access to and storage of data in memory 302. For example, memory controller 304 may be USB mass storage controller that implements a USB host controller. Memory controller 304 may be coupled to communication bus 303.

Device 100 includes a transfer interface 306. Transfer interface 306 may be any type of interface capable of mating with a corresponding interface. For example, transfer interface 306 may be a male USB type-A connector. Transfer interface 303 may be coupled to communications bus 303. Device 100 may receive data via transfer interface 306 for storage in memory 302. Device 100 may transfer data from memory 302 via transfer interface 306.

Device 100 includes a receiving interface 308. Receiving interface 308 may be any type of interface capable of mating with the corresponding transfer interface. For example, receiving interface 308 may be a female USB type-A connector. Device 100 may receive data via receiving interface 308 for storage in memory 302. Device 100 may transfer data from memory 302 via receiving interface 308. Receiving interface 308 may be coupled to communication bus 303. By including both transfer interface 306 and receiving interface 308, data may be directly transferred from device 100 to another similar device.

Device 100 may include a switch 310. For example, switch 310 may be a button. Switch 310 may be coupled to communication bus 303. Switch 310, when actuated, may cause data transfer from device 100. Additionally, switch 310, when actuated, may cause data to be transferred to device 100. One skilled in the art will realize that switch 310 may be any type of actuation device capable of initiating data transfer to and from device 100.

Device 100 may include a data indicator 312. Indicator 312 may be coupled to communication bus 303. Indicator 312 may display the amount of data transferred to or received by device 100. For example, indicator 312 may be a display, such as a liquid crystal display, LED display, or the like. One skilled in the art will realize that indicator 312 may be any type of device capable of displaying the amount of data received or transferred.

Device 100 may include an activation indicator 314. Indicator 314 may indicate that device 100 has been activated during data transfer or storage. For example, indicator 314 may be a LED. One skilled in the art will realize that indicator 314 may be any type of device capable of indicating that portable storage device 100 has been activated.

Portable storage device 100 may include a power source 316. Power source 316 may be coupled to the components of device 100 to provide power during data transfer. For example, power source 316 may be a battery, capacitor, or the like. One skilled in the art will realize that power source 316 may be any type of device capable of providing power to the components of device 100.

Other embodiments of the present teaching will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A first storage device, comprising:
    a transfer interface to transfer data objects comprising at least a security authorization object and a file, wherein the security authorization object comprises an authorization to perform an action associated with transfer of the file, and wherein the security authorization object is a separate data object from the file;
    a memory coupled to the transfer interface of the first storage device, the memory to store data objects;
    a receiving interface of the first storage device, coupled to the memory and to a transfer interface of a second storage device, the receiving interface of the first storage device to receive a first plurality of data objects transferred by the second storage device via the transfer interface of the second storage device coupled to the receiving interface of the first storage device and a second plurality of data objects transferred by a third storage device coupled to the second storage device via a transfer interface of the third storage device coupled to the receiving interface of the second storage device, wherein the second plurality of data objects is passed to the first storage device through the second storage device, wherein the first storage device is configured to merge, by the first storage device, the first plurality of data objects transferred by the second storage device and the second plurality of data objects transferred by the third storage device and passed to the first storage device through the second storage device, and wherein the first storage device, the second storage device and the third storage device are configured to perform one or more pairs of operations with respect to corresponding transferred objects, the one or more pairs of operations comprising encoding and decoding or encryption and decryption;
    a user interface device comprising a display and a switch, wherein the display is to present data objects stored in the memory, and wherein the switch is to allow for selection of one of the data objects presented on the display;
    in response to a first selection of the security authorization object via the display and the switch, the user interface device to cause the security authorization object to be transferred on the transfer interface of the first storage device to a trusted platform interface of a trusted platform device while the file remains on the first storage device; and
    in response to the transfer of the security authorization object and in response to a second selection of the file via the display and the switch, the user interface device to cause the action associated with the transfer of the file to be performed on the first storage device.

2. The device of claim 1 further comprising:
    a sign, affixed to the device, to indicate a direction of transfer of the data objects.

3. The device of claim 1, further comprising a counter, communicably coupled to a communications bus coupled to the memory, to display an amount of the data objects transferred over at least one of the transfer interface or the receiving interface.

4. The device of claim 1 wherein the data objects further comprise a digital cash object.

5. The device of claim 1 wherein the display to present the data objects in a set of menus.

6. The device of claim 1 further comprising a communications bus coupled to the memory, the transfer interface, the receiving interface and the user interface device.

7. The device of claim 6 further comprising a memory controller, communicably coupled to the communications bus, to control access to the memory.

8. The device of claim 7 further comprising a battery coupled to the memory and the memory controller.

9. The device of claim 1 wherein the switch is further to control the action associated with transfer of the file.

10. The device of claim 9, wherein the action comprises one of accepting or refusing the transferring of a selected data object.

11. The device of claim 9 wherein the action comprises erasing a selected data object transferred from the memory.

12. A first Universal Serial Bus (USB) storage device, comprising:
    a transfer USB interface to transfer data objects comprising at least a security authorization object and a file, wherein the security authorization object comprises an authorization to perform an action associated with transfer of the file, wherein the security authorization object is a separate data object from the file, and wherein the transfer USB interface comprises a male USB connector;
    a memory coupled to the transfer USB interface of the first USB storage device, the memory to store the data objects;
    a receiving USB interface of the first USB storage device, coupled to the memory and to a transfer USB interface of a second USB storage device, the receiving USB interface of the first USB storage device to receive a first plurality of data objects transferred by the second USB storage device via the transfer USB interface of the second USB storage device coupled to the receiving USB interface of the first USB storage device and a second plurality of data objects transferred by a third USB storage device coupled to the second USB storage device via a transfer USB interface of the third USB storage device coupled to the receiving USB interface of the second USB storage device, wherein the second plurality of objects is passed to the first USB storage device through the second USB storage device, wherein the first USB storage device is configured to merge, by the first USB storage device, the first plurality of data objects transferred by the second USB storage device and the second plurality of data objects transferred by the third USB storage device and passed to the first USB storage device through the second USB storage device, wherein the first USB storage device, the second USB storage device and the third USB storage device are configured to perform one or more pairs of operations with respect to corresponding transferred data objects, the one or more pairs of operations comprising encoding and decoding or encryption and decryption; and wherein the receiving USB interface comprises a female USB connector;

a user interface device comprising a display and a switch, wherein the display is to present data objects stored in the memory, and wherein the switch is to allow for selection of one of the data objects presented on the display;

in response to a first selection of the security authorization object via the display and the switch, the user interface device to cause the security authorization object to be transferred on the transfer USB interface of the first USB storage device to a trusted platform interface of a trusted platform device while the file remains on the first USB storage device; and in response to the transfer of the security authorization object and in response to a second selection of the file via the display and the switch, the user interface device to cause the action associated with the transfer of the file to be performed on the first USB storage device.

13. The device of claim 12 further comprising a sign, affixed to the device, to indicate a direction of transfer of the data objects.

14. The device of claim 12, further comprising a counter, communicably coupled to a communications bus coupled to the memory, to display an amount of the data objects transferred over at least one of the transfer USB interface or the receiving USB interface.

15. The device of claim 12 wherein the data objects further comprise a digital cash object.

16. The device of claim 12 wherein the display to present the data objects in a set of menus.

17. The device of claim 12 further comprising a communications bus, communicably coupled to the memory, the transfer USB interface, the receiving USB interface and the user interface device.

18. The device of claim 17 further comprising a memory controller, communicably coupled to the communications bus, to control access to the memory.

19. The device of claim 18 further comprising a battery coupled to the memory and the memory controller.

20. The device of claim 12 wherein the switch is further to control the action associated with transfer of the file.

21. The device of claim 20, wherein the action comprises one of accepting or refusing the transferring of a selected data object.

22. The device of claim 21 wherein the action comprises erasing the selected data object transferred from the memory.

* * * * *